United States Patent [19]

Ho

[11] 4,340,550
[45] Jul. 20, 1982

[54] OLIGOMER PELLETS OF ETHYLENE TEREPHTHALATE

[75] Inventor: Chungfah H. Ho, Kinston, N.C.

[73] Assignee: E. I. Du Pont de Nemours and Company, Wilmington, Del.

[21] Appl. No.: 209,324

[22] Filed: Nov. 24, 1980

[51] Int. Cl.³ .............................................. B01J 2/06
[52] U.S. Cl. ....................................... 264/13; 264/85
[58] Field of Search .................................... 264/13, 85

[56] References Cited

U.S. PATENT DOCUMENTS

| | | | |
|---|---|---|---|
| 3,033,826 | 5/1962 | Kibler et al. | 260/76 |
| 3,342,782 | 9/1967 | Barkey | 260/75 |
| 3,657,388 | 4/1972 | Konigsbrunn et al. | 260/873 |
| 3,843,340 | 10/1974 | Cone | 65/21 |
| 3,969,324 | 7/1976 | Berkau et al. | 260/75 |
| 4,165,420 | 8/1979 | Rinehart | 526/63 |
| 4,201,739 | 5/1980 | Anderson | 264/13 |
| 4,220,441 | 9/1980 | Tomita et al. | 264/13 |

FOREIGN PATENT DOCUMENTS 54-52050 4/1979 Japan.
1257967 12/1971 United Kingdom.

Primary Examiner—James R. Hall

[57] ABSTRACT

Preparation of free-flowing pellets of ethylene terephthalate oligomer by water quenching droplets of molten oligomer.

3 Claims, 1 Drawing Figure

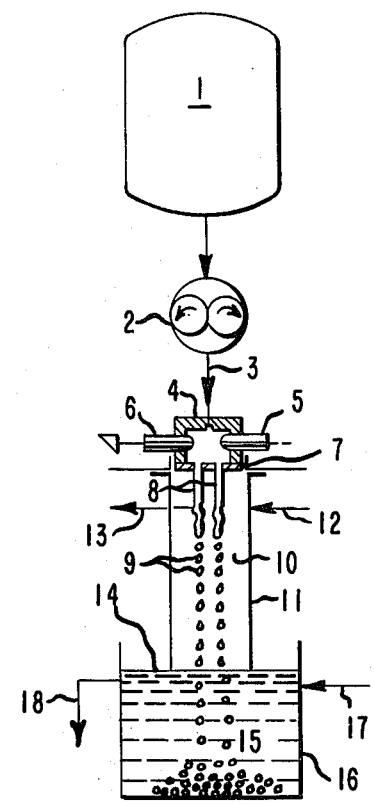

OLIGOMER PELLETS OF ETHYLENE TEREPHTHALATE

FIELD OF THE INVENTION

This invention relates to process for preparing ethylene terephthalate oligomer in a readily transportable solid form.

DESCRIPTION OF THE PRIOR ART

Ethylene terephthalate oligomer (generally having up to 10 repeat units) is an intermediate in the manufacture of polyethylene terephthalate. The conventional method for preparing and utilizing ethylene terephthalate oligomer has been to react ethylene glycol with terephthalic acid or dimethyl terephthalate to form the oligomer, followed directly by a polycondensation step in the molten phase to produce commercial grade polyethylene terephthalate for fiber, film or plastic uses. Ethylene terephthalate oligomer can also be prepared by depolymerizing polyethylene terephthalate fiber, film and plastic waste with ethylene glycol addition followed by a polycondensation step to reproduce commercial grade polyethylene terephthalate.

Various methods and equipment have been proposed for commercial production of oligomer in a transportable solid form. In U.S. Pat. No. 4,165,420 there is disclosed a method of forming fine spherical beads of oligomer that involves atomizing molten polyester prepolymer into droplets and then cooling and solidifying the droplets in an inert gas. The spherical beads have a particle size in the range of from 100 to 250 microns depending on the speed of the centrifugal atomizer which is used. These particles are so fine as to present safety and handling problems such as spark-induced explosion, dusting, bridging, caking, etc. Further, if added in a melt phase polyester polymerization system, the particles will float on the molten mass and adequate mixing with the polycondensation mass will not take place.

It has also been known to cast molten oligomer on a drum or belt, cool and solidify the oligomer, and then break and pulverize the solidified product into irregularly shaped flake. This too causes considerable dusting and is an expensive operation. Lastly, it is known to spray water droplets on top of a molten oligomer layer to cool and solidify the oligomer. This is followed by mechanically breaking up the layer into irregularly shaped chips which are then ground.

Some of the above-mentioned methods are expensive since they require large inert gas recirculating and cooling systems. Other methods involving drum or belt-type flakers are less efficient and are difficult and expensive to scale up. A method has now been found for making a new oligomer product which can be easily handled, transferred, stored and melted in melt phase polymerization plants.

SUMMARY OF THE INVENTION

This invention is directed to the preparation of ethylene terephthalate oligomer pellets. These pellets may be prepared by forcing molten oligomer having an intrinsic viscosity of between about 0.08 and 0.15 through a plurality orifices of an orifice plate into an inert gas zone to form molten oligomer jets which dissociate into spherical droplets under the influence of surface tension, allowing the droplets to fall through the inert gas zone into a body of water to solidify the droplets into pellets and removing the pellets from the water. The ethylene terephthalate oligomer pellets of the invention are in the form of slightly flattened beads having a thickness of about 0.3 to 2.0 mm and a circular diameter from about 0.8 to 4.0 mm. The pellets are free flowing and have a bulk density of from about 37 to 50 pounds/cu. ft.

BRIEF DESCRIPTION OF THE DRAWING

The single FIGURE schematically shows apparatus which can be used to carry out the process and to prepare the novel pellets of the invention.

DETAILED DESCRIPTION OF THE INVENTION

The oligomer pelletizing process of the present invention will be readily understood by reference to the FIGURE. Molten ethylene terephthalate oligomer with intrinsic viscosity of from about 0.08 to 0.15 is prepared in a reactor vessel 1 and is metered to pelletizing head 4 via gear pump 2 and jacketed transfer line 3. The gear pump 2 and transfer line 3 are maintained at a temperature above the melting temperature of the oligomer by means not shown. The pelletizing head (manifold) 4 is equipped with pressure bulb 5 and thermocouple 6 for pressure and temperature measurements. The pelletizing head temperature is controlled by means not shown to provide an oligomer melt viscosity of less than 3 poises. Temperatures between about 260° C. and 280° C. are useful. The pelletizing head is also fitted with removable orifice plate 7 containing multiple small diameter orifices, generally from about 0.25 to 2.0 mm. The pressure in the pelletizing head 4, developed by the gear pump 2 (generally in the range of 3 to 48 psig) forces the oligomer melt through these multiple orifices to form molten oligomer jets 8. The oligomer melt jets are directed outwardly from the orifices into an inert gas zone 10 where they disassociate generally within about one foot of the orifice plate into spherical droplets 9 under the influence of surface tension. These molten droplets fall through inert gas and are quenched/solidified into oligomer pellets 15 in quenching tank water 14. The overall oligomer drop-height (distance between orifice plate 7 and quenching water surface 14) must allow for dissociation of the molten jet and is usually from about 20 to 40 inches. After purging with inert gas preferably nitrogen, at ambient temperature (about 20° C.), the inert gas is continuously introduced at slightly above atmospheric pressure through inlet 12 into inert gas zone 10, enclosed by a chute 11 which extends from orifice plate 7 to slightly below the water surface 14, in the quenching tank 16, to provide inert-gas blanketing and to prevent oligomer oxidative degradation. The excess inert gas is purged through exit 13. Quenching water temperature in tank 16 is maintained below boiling, preferably below 80° C., and excess heat obtained from oligomer quenching is removed by adding cool water through inlet 17 and bleeding off excess water through overflow pipe 18. Water depth in tank 16 is usually about 2 to 35 inches. The water quenches the molten droplets after which the pellets are removed from the water tank 16 and are dried.

The water-quenched oligomer pellets are slightly flattened beads about 0.3 to 2.0 mm thick and about 0.8 to 4.0 mm in circular diameter. The oligomer pellets have an intrinsic viscosity of about 0.08 to 0.15 and melt within the range of 230° to 250° C.

The oligomer pellets quenched in water at temperatures below 50° C. are colorless (transparent to translucent) due to the glassy amorphous structure of the oligomer caused by rapid quenching of molten oligomer below its glass transition temperature (50° C.). The oligomer pellets crystallize and became opaque with a snow-white color when heated above the glass transition temperature of 50° C. The large particle size and hard smooth surface of the pellets promote ready draining of the water and drying. The pellets are free-flowing, and easy to handle. An inert gas blanket during transportation or storage can be avoided since the pellets are resistant to spark-induced explosion.

The slightly flattened appearance of the pellets is due to the molten droplets striking the water surface. If the distance between the orifice plate and the water tank is too short, a tail forms on the pellets that impedes free flow of the pellets. If too great a distance is used, the pellets would be flat and fragile.

Measurements

Intrinsic viscosity is the ratio of natural logarithmic relative viscosity value (ratio of polymer solution to solvent flow times in a capillary viscometer) to solution concentration (in grams/100 ml). The intrinsic viscosity numbers reported herein were measured in a 25:75 mixture by volume of trifluoroacetic acid and methylene chloride at an oligomer concentration of about 0.32 gram per 100 ml. of solvent mixture, at a temperature of 25° C.

The concentration of free carboxyl groups in oligomer is measured by dissolving about 0.01 grams oligomer sample in 15 mls. distilled O-cresol, diluted with 35 mls chloroform, and titrated with methanolic potassium hydroxide using bromophenol blue as an indicator. The titration is monitored photometrically at 600 mu and recorded.

Bulk density is the weight per unit volume of many oligomer pellets. Bulk density is obtained by dividing the net weight of oligomer pellets by their volume measured in a graduated cylinder.

By "free-flowing" is meant the angle of repose of oligomer pellets produced by this invention remains below 40 degrees, preferably below 36 degrees. The angle of repose is defined as the constant angle to the horizontal assumed by a conelike pile of the oligomer pellets. This pile is carefully built up by dropping oligomer pellets from a point about 7 inches above the horizontal until a constant angle is measured. The lower the angle of repose of a dry material, the more flowable a material will be. The material flowability is judged "good" when angle of repose is less than 36 deg. and "fair" when angle of repose is between 36 and 40 deg. Any material with angle of repose above 46 deg. has poor flowability.

EXAMPLE

Terephthalic acid and ethylene glycol were reacted in a well-agitated reaction vessel 1 as shown in the FIGURE and the resultant molten oligomer had an intrinsic viscosity of 0.135, an ethylene gyycol to terephthalic acid molar ratio of 1.08, and a free carboxyl content of 893 equivalents per $10^6$ grams. Said oligomer was metered at a rate of 13.2 pounds/hour via a gear pump 2 from the reactor to the pelletizing head 4 fitted with an orifice plate 7. The molten oligomer in the pelletizing head was maintained at 267° C. by means not shown in the FIGURE. The 6.5 psig pelletizing head pressure, developed by the gear pump, forced the molten oligomer through four 0.5 mm (0.0197 inches) diameter orifices of the orifice plate to form four molten oligomer jets of about 2 to 5 inches in length, at which point they dissociated into streams of discrete spherical droplets under the influence of oligomer surface tension. The oligomer droplets fell through an inert gas blanketed free-fall zone and were quenched and solidified into oligomer pellets in a quenching tank containing water. The water was maintained at 20° C. in the quenching tank. Inert gas was fed into the free-fall zone at a rate of 10 SCFH. The distance between the orifice plate and the quenching water surface was about 22 inches. The pellets are slightly flattened. This is caused by the molten oligomer droplets impacting the quenching water surface. The oligomer pellets are about 0.3 to 2.0 mm thick and 0.8 to 4.0 mm in circular diameter with a median diameter of 2.05 mm. The oligomer pellets are free-flowing and have an angle of repose of about 35 degrees. The oligomer pellets have the following screen analysis (Tyler equivalent designation mesh):

|          | Weight Percent |
|----------|----------------|
| −20 mesh | 1.6            |
| +20 mesh | 3.6            |
| +14 mesh | 15.9           |
| +10 mesh | 49.7           |
| +8 mesh  | 19.8           |
| +6 mesh  | 3.9            |
| +5 mesh  | 5.6            |

The pellets of the invention are well suited for remelting and further polymerization under polycondensation/polyesterification conditions to give high molecular weight polymer for spinning into fibers or extrusion into films. If desired, the pellets may be remelted and mixed with molten monomer or low polymer from other sources before final polymerization. In a preferred use, remelted terephthalic acid oligomer is mixed with molten monomer derived from dimethyl terephthalate to give a prepolymer easily polymerized to fiber forming molecular weight.

I claim:

1. A process for producing free-flowing pellets of ethylene terephthalate oligomer comprising forcing a molten ethylene terephthalate oligomer having an intrinsic viscosity of from about 0.08 to 0.15 through a plurality of orifices of an orifice plate under pressure into an inert gas zone to form jets of the oligomer which dissociate into spherical droplets under the influence of surface tension, allowing the droplets to fall through the inert gas zone into a body of water to solidify the droplets into pellets, said body of water being at a distance of about 20 to 40 inches from said orifice plate, and removing the pellets from the water.

2. The process of claim 1 wherein the molten polymer is fed to the orifices at a pressure of from about 3 to 48 psig and at a temperature of from about 260° C. to 280° C., said orifices having a diameter of from 0.25 to 2.0 mm.

3. The process of claim 1 or 2 wherein the body of water is at a temperature below about 80° C.

* * * * *